(12) United States Patent
Backman

(10) Patent No.: US 9,430,998 B2
(45) Date of Patent: Aug. 30, 2016

(54) RADIO APPARATUS COMPRISING AN AGGLOMERATION OF ACOUSTICALLY ADSORBING MEMBERS

(75) Inventor: Juha Reinhold Backman, Espoo (FI)

(73) Assignee: Nokia Technologies Oy, Espoo (FI)

( * ) Notice: Subject to any disclaimer, the term of this patent is extended or adjusted under 35 U.S.C. 154(b) by 80 days.

(21) Appl. No.: 13/700,555

(22) PCT Filed: Jun. 1, 2010

(86) PCT No.: PCT/IB2010/052443
§ 371 (c)(1),
(2), (4) Date: Mar. 19, 2013

(87) PCT Pub. No.: WO2011/151675
PCT Pub. Date: Dec. 8, 2011

(65) Prior Publication Data
US 2013/0170690 A1    Jul. 4, 2013

(51) Int. Cl.
| | |
|---|---|
| H04R 1/28 | (2006.01) |
| G10K 11/00 | (2006.01) |
| H04R 1/02 | (2006.01) |
| H04R 1/42 | (2006.01) |
| H04M 1/03 | (2006.01) |
| H04R 1/10 | (2006.01) |

(52) U.S. Cl.
CPC ............. *G10K 11/002* (2013.01); *H04R 1/028* (2013.01); *H04R 1/2803* (2013.01); *H04M 1/035* (2013.01); *H04R 1/1091* (2013.01); *H04R 1/42* (2013.01); *H04R 2499/11* (2013.01)

(58) Field of Classification Search
CPC .. H04R 1/2803; H04R 1/2826; H04R 1/288; H04R 2499/13; G10K 11/002
USPC ................ 381/334, 335, 346–348, 354, 386; 181/198, 199, 151, 284, 294
See application file for complete search history.

(56) References Cited

U.S. PATENT DOCUMENTS

| | | | |
|---|---|---|---|
| 4,433,749 A | 2/1984 | Watkins et al. ................ 181/151 |
| 6,834,181 B2* | 12/2004 | Kaikuranta et al. .......... 455/90.3 |
| 7,743,877 B2* | 6/2010 | Saiki et al. .................... 181/151 |
| 8,184,826 B2* | 5/2012 | Matsumura et al. ............ 381/89 |
| 8,630,435 B2* | 1/2014 | Mellow et al. ................ 381/345 |
| 2005/0233781 A1 | 10/2005 | Erixon et al. ............... 455/575.1 |
| 2006/0269095 A1* | 11/2006 | Matsumura et al. .......... 381/421 |
| 2007/0127760 A1* | 6/2007 | Saiki et al. .................... 381/351 |
| 2007/0165895 A1* | 7/2007 | Matsumura et al. .......... 381/351 |
| 2007/0195982 A1* | 8/2007 | Saiki et al. .................... 381/345 |
| 2008/0135327 A1* | 6/2008 | Matsumura et al. .......... 181/151 |
| 2009/0028370 A1* | 1/2009 | Matsumura et al. .......... 381/386 |
| 2009/0120715 A1* | 5/2009 | Saiki .............................. 181/151 |

(Continued)

FOREIGN PATENT DOCUMENTS

| | | |
|---|---|---|
| EP | 1 764 861 A1 | 3/2007 |
| WO | WO 03/101147 A1 | 12/2003 |
| WO | WO 2007/086669 | 8/2007 |

*Primary Examiner* — Curtis Kuntz
*Assistant Examiner* — Joshua Kaufman
(74) *Attorney, Agent, or Firm* — Harrington & Smith

(57) ABSTRACT

An apparatus includes an acoustic chamber, an agglomeration of acoustically adsorbing members in the acoustic chamber and suitably located substantially on or in a non-conductive support that comprises a substantially acoustically transparent material, and a transducer configured to generate acoustic waves which enter the acoustic chamber. Each acoustically adsorbing member is separated from neighboring members.

17 Claims, 10 Drawing Sheets

(56) References Cited

U.S. PATENT DOCUMENTS

| | | | |
|---|---|---|---|
| 2009/0220116 A1 | 9/2009 | Ryou et al. | 381/354 |
| 2009/0245562 A1* | 10/2009 | Saiki et al. | 381/345 |
| 2009/0316920 A1* | 12/2009 | Matsumura et al. | 381/59 |
| 2010/0034411 A1* | 2/2010 | Mellow | H04R 1/225 381/345 |
| 2010/0074463 A1* | 3/2010 | Fukunishi et al. | 381/386 |
| 2010/0135516 A1* | 6/2010 | Saiki et al. | 381/386 |
| 2010/0206658 A1* | 8/2010 | Slotte | 181/151 |
| 2010/0329494 A1* | 12/2010 | Rouvala et al. | 381/338 |
| 2010/0329498 A1* | 12/2010 | Rouvala et al. | 381/354 |
| 2012/0015697 A1* | 1/2012 | Spencer | 455/569.1 |
| 2012/0027243 A1* | 2/2012 | Imamura et al. | 381/389 |
| 2012/0063627 A1* | 3/2012 | Takashima et al. | 381/346 |
| 2013/0170687 A1* | 7/2013 | Papakyriacou et al. | 381/338 |
| 2013/0341118 A1* | 12/2013 | Papakyriacou et al. | 181/199 |
| 2014/0064540 A1* | 3/2014 | Lin | 381/346 |

\* cited by examiner

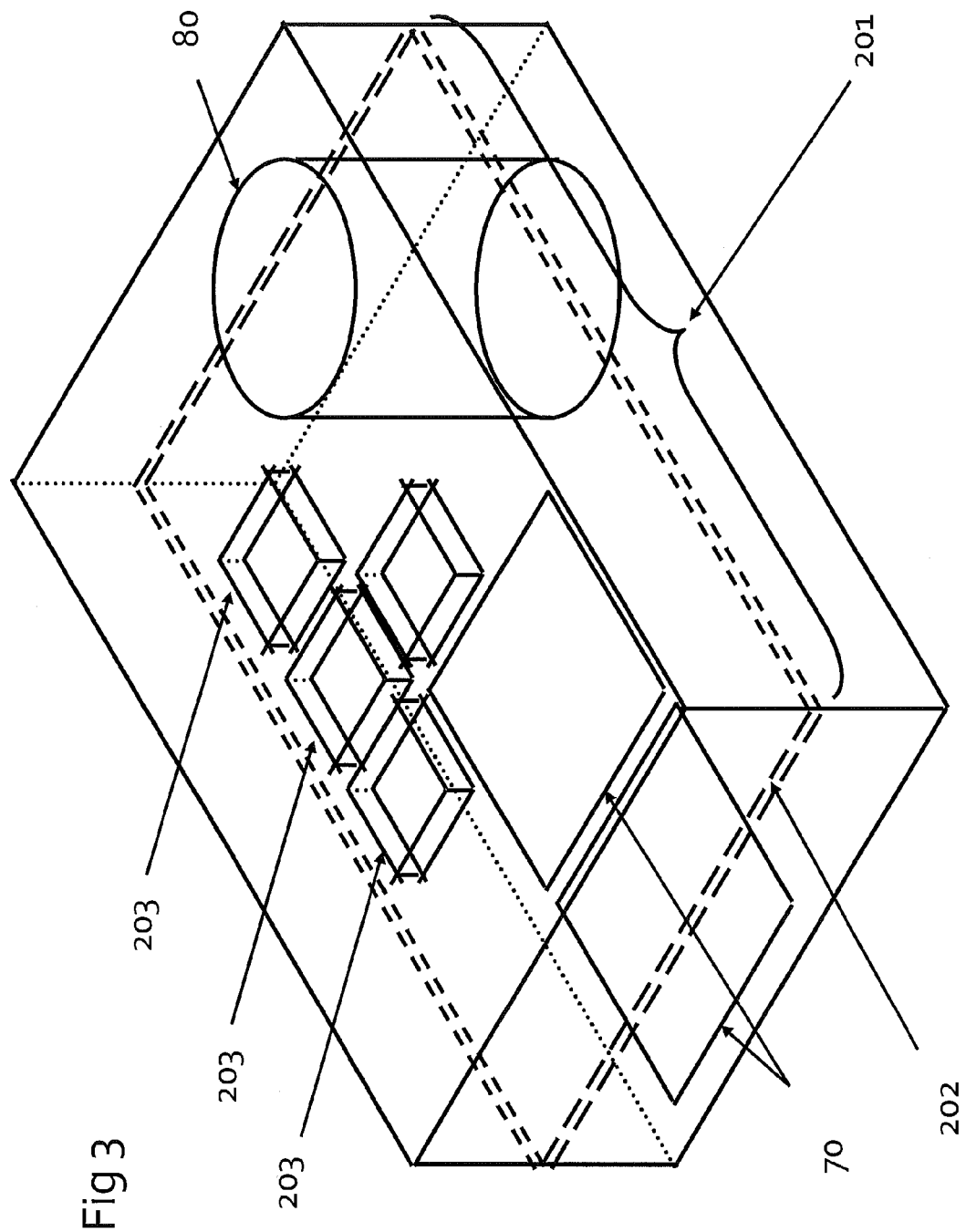

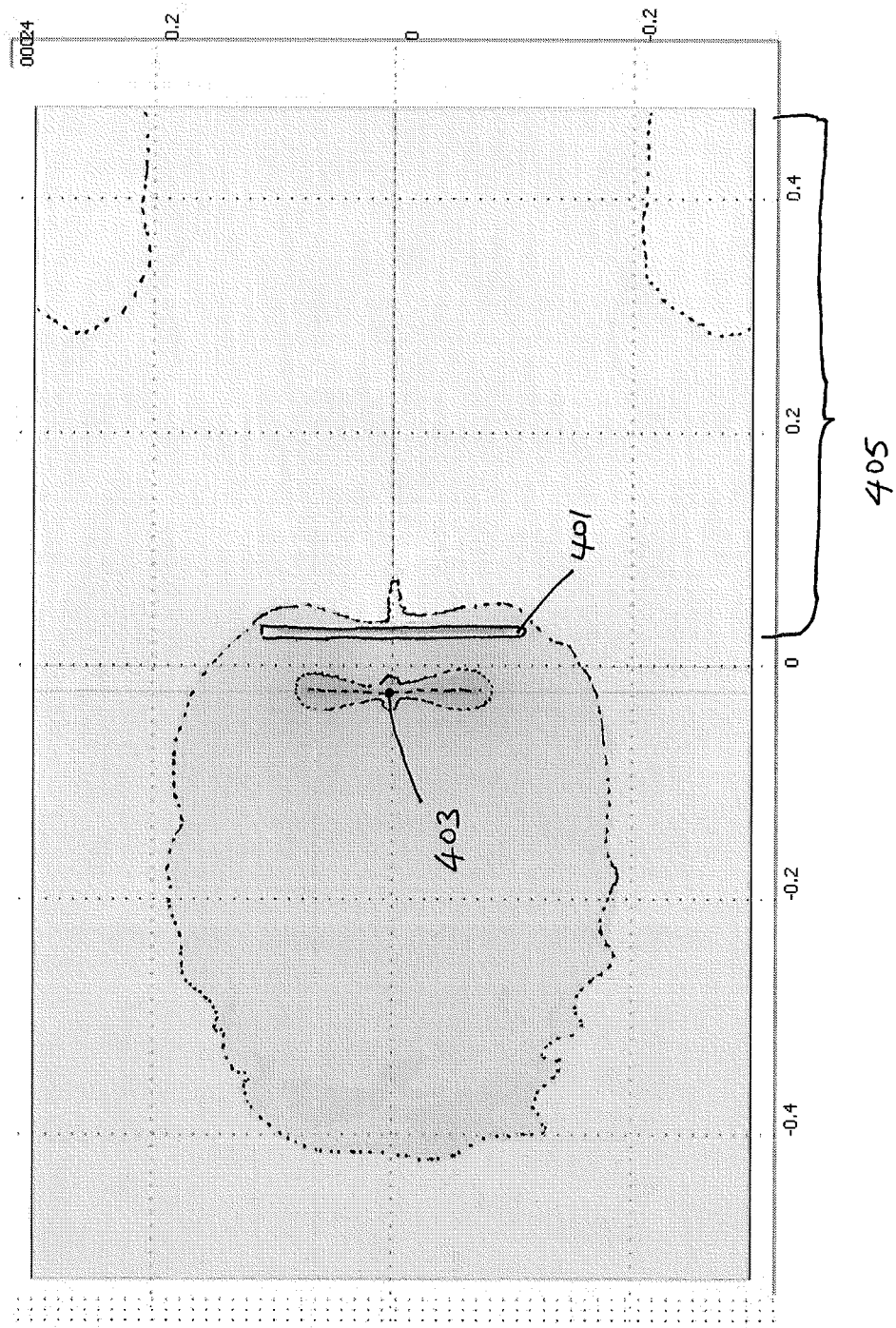
Fig 4.4

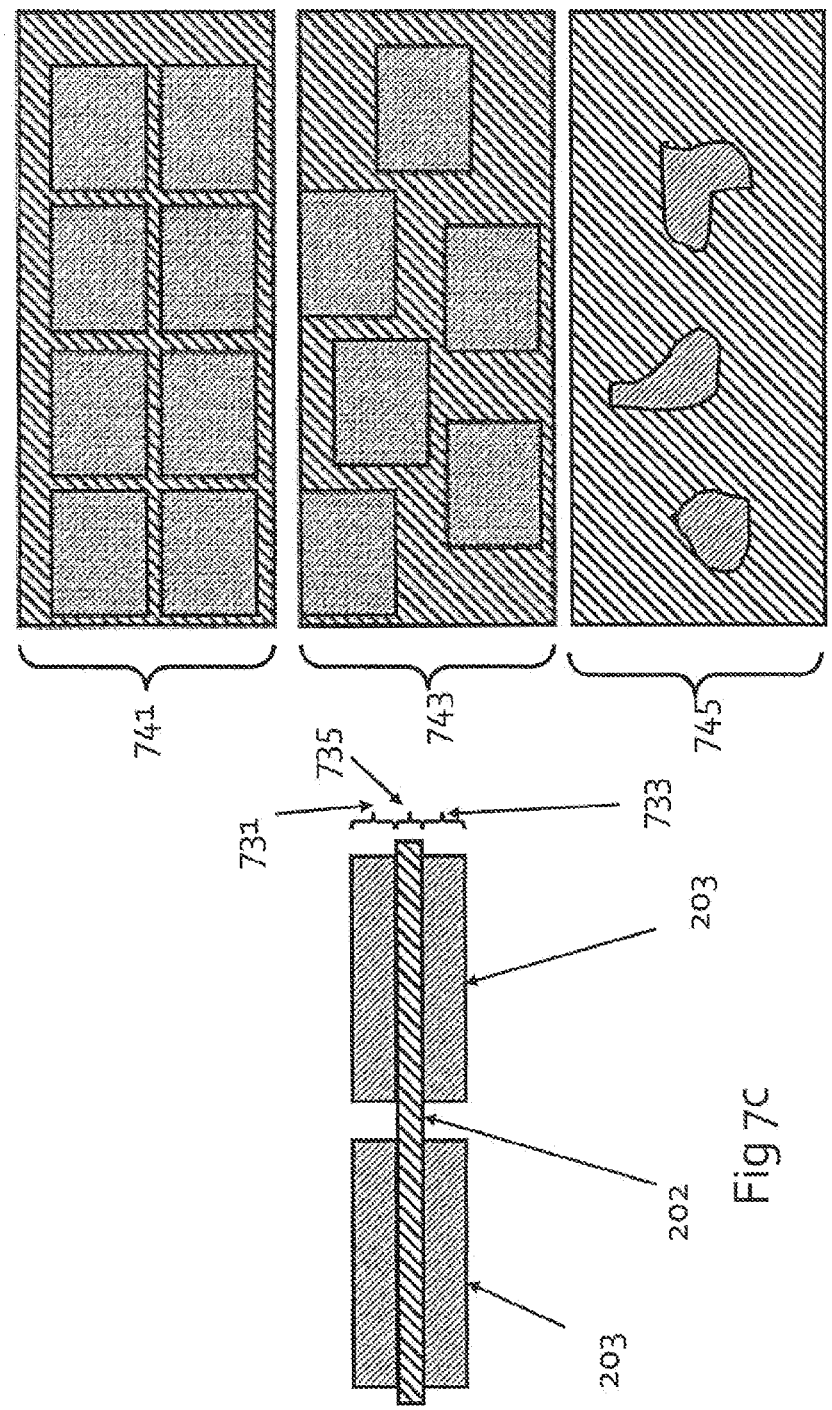

RADIO APPARATUS COMPRISING AN AGGLOMERATION OF ACOUSTICALLY ADSORBING MEMBERS

TECHNICAL FIELD

The present invention relates to structure and configuration of acoustic materials or apparatus in radio equipment. The invention further relates to, but is not limited to, structure and configuration of acoustic materials or apparatus in portable radio equipment.

BACKGROUND

The growth in the use of portable electronic devices such as mobile communication devices, cellular telephones and the like has driven the design of such devices to become smaller and more convenient. Consumers have become accustomed to the convenience and portability of such electronic devices, particularly, cellular telephones and other convergence devices, such as audio and audio-video devices with communication capabilities and have demanded that those devices become even more convenient and even more portable. The constant thrust in the portable device design is thus to make the device as small as possible.

Furthermore there is also an increasing demand for such devices to operate in a hands-free mode where the device is operational without requiring it to be held to the user's ear. For example an audio playback device which can be used without headphones or separate loudspeaker components. Such devices typically include an internal antenna and speaker component. The antenna component enables communication to other devices. For example such communication can be a "cellular" communication system or "wireless broadband" communication system, specific examples may be a WiFi connection, or a UMTS (universal mobile telecommunication system) connection. Such connections enable the device to communicate with other devices, for example to download further audio and video or hold a voice communication with a further device.

The mechanical design and operational consideration for the antenna and speaker must be taken into account to ensure the proper operation of each to obtain the desired results. The antenna includes an RF (Radio Frequency) emitter (which can equally be considered to be a receiver) that is generally held or placed in a spaced separation with respect to a ground plate mounted in the chassis of the device. The RF emitter electrically connects to the operational electronic circuitry of the mobile device and the spaced separation between the RF emitter and the ground plate area defines the mechanical outline of the antenna chamber volume. Furthermore the speaker component is in some designs located separate and away from the RF emitter to prevent interference with the emitter.

It is also a current requirement that the speaker component provides a sufficiently high air displacement and pressure to provide audio sounds loud enough to implement a hands-free operation. Typically this can be generated by having the speaker component mounted in an enclosure of some sort defining a chamber which enhances bass tone production. The physical size or volume of the chamber influences the audio quality as a larger volume generally results in better audio quality. A drawback with such traditional speaker components in meeting these audio quality requirements is their large physical size. One attempt to reduce the physical dimensions used by the antenna and chamber is the combined antenna speaker chamber configuration. This for example is shown in FIG. 2 whereby the antenna speaker chamber 60 comprises a planar antenna 70 and speaker 80 which share a common cavity or chamber 90 with a portion 92 of the chamber 90 located in the chamber 90 in the area beneath the antenna 70. The construction of the combined antenna speaker chamber thus combines the separate antenna and speaker chambers in an attempt to meet both the acoustic requirements and the radio frequency requirements of the mobile device. The volume of the chamber 90 is thus given by the width $W_c$ multiplied by the height $H_c$ multiplied by the length $L_c$ where the length would be less than the individual lengths for the speaker chamber and the antenna.

In order to attempt to reduce the volume of the acoustic or speaker chamber in order to further reduce the size of such devices, it is known to use acoustically absorptive materials which increase the effective volume, reduce resonances and thus result in extended bandwidth improved efficiency and reduced coloration of the chamber. The use of absorptive materials in manufacturing produces a substantial increase in cost and as such is typically only justifiable where the effective volume is substantially increased. Materials such as plastic foams, synthetic or natural fibres do not produce sufficient efficiencies to cost of use ratio to warrant their manufacture. Materials with large surface activity such as zeolite derived products which can provide somewhere between 1.5 to 2.2 times the increase in an effective acoustic volume are furthermore difficult to handle in a manufacturing and as such are not suitable for mass production at sufficient economies. Activated carbon which is available in sheet form and thus suited for manufacturing although promising in producing similar volumetric efficiencies has a different problem in that the material is electrically conductive. This electrical conductivity causes RF losses due to conductive effects whereby the RF signal being transmitted or received generates currents within the sheet carbon reducing the electric field strength.

The use of carbon electrically conductive material thus while producing sufficient efficiencies in effective volume and being suitable for manufacturing causes significant losses in both transmission and reception when placed near the radio antenna.

SUMMARY

Embodiments of the present invention aim to address the above problem.

There is provided according to a first aspect of the invention an apparatus comprising: an agglomeration of acoustically adsorbing members suitably located substantially on or in a non-conductive support, wherein each acoustically adsorbing member is separated from neighbouring members.

The adsorbing members may comprise at least one of: activated carbon bodies; carbon nanotubes; and a plurality of connecting sub-member bodies.

The adsorbing members may be substantially regular in shape.

The adsorbing members may be substantially identical.

Different ones of the adsorbing members may be differently sized.

The adsorbing members may comprise separated parts of a single acoustically adsorbing material piece.

The non-conductive support may comprise a substantially acoustically transparent material upon which the agglomeration of acoustically adsorbing members are located such that each acoustically adsorbing member is separated from neighbouring members by an air gap.

The non-conductive support may comprise a substantially acoustically transparent material within which the agglomeration of acoustically adsorbing members are deposited such that each acoustically adsorbing member is substantially separated from neighbouring members by non-conductive support material.

The non-conductive support may comprise a grid or mesh structure.

The non-conductive support may be a flexible material.

The apparatus may further comprise at least one further agglomeration of acoustically adsorbing members affixed substantially on or in a further non-conductive support, wherein each agglomeration is separated by at least one of the non-conductive support or further non-conductive support.

The apparatus may further comprise at least one further agglomeration of acoustically adsorbing members affixed substantially on or in the non-conductive support, wherein the agglomeration of acoustically adsorbing members is affixed to one side of the non-conductive support and the further agglomeration is affixed to a further side of the non-conductive support.

Each acoustically adsorbing member may have at least one dimension less than an associated radio frequency wavelength.

Each acoustically adsorbing member may have at least one dimension less than 20% of the associated radio frequency wavelength.

Each acoustically adsorbing member may have at least one dimension less than one order of magnitude of the associated radio frequency wavelength.

The apparatus may be an acoustic transducer system further comprising: a chamber within which the agglomeration of acoustically adsorbing members suitable located substantially on or in a non-conductive support is located; a transducer located substantially within the chamber; and wherein the chamber further comprises an antenna element configured to operate at the associated radio frequency wavelength.

According to a second aspect of the invention there is provided a method comprising using an agglomeration of acoustically adsorbing members suitably located substantially on or in a non-conductive substrate, wherein each acoustically adsorbing member is separated from neighbouring members.

Each acoustically adsorbing member may have dimensions less than an associated radio frequency wavelength in an acoustic transducer system.

Each acoustically adsorbing member may have dimensions less than 20% of the associated radio frequency wavelength.

BRIEF DESCRIPTION OF DRAWINGS

For better understanding of the present invention, reference will now be made by way of example to the accompanying drawings in which:

FIG. 3 shows schematically an apparatus suitable for implementing some embodiments of the application;

FIGS. 4a and 4b show schematically a homogeneous sheet model and E-field simulation;

FIGS. 7a, 7b, 7c, and 7d show schematic arrangements of the arrangement of patches and non-conducting substrates according to embodiments of the application.

DETAILED DESCRIPTION OF SOME EMBODIMENTS

Figure 1:
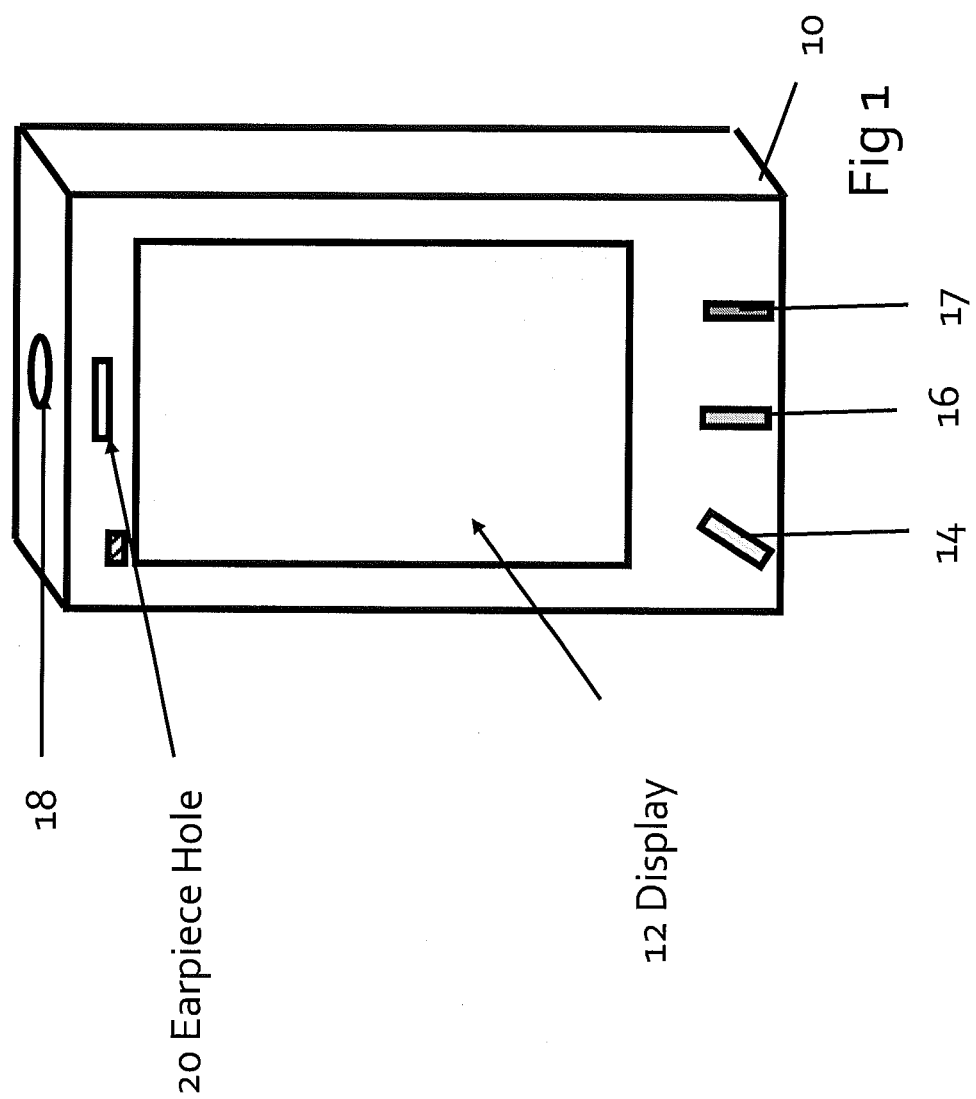
FIG. 1 shows schematically an electronic device employing embodiments of the application.
Figure 2:
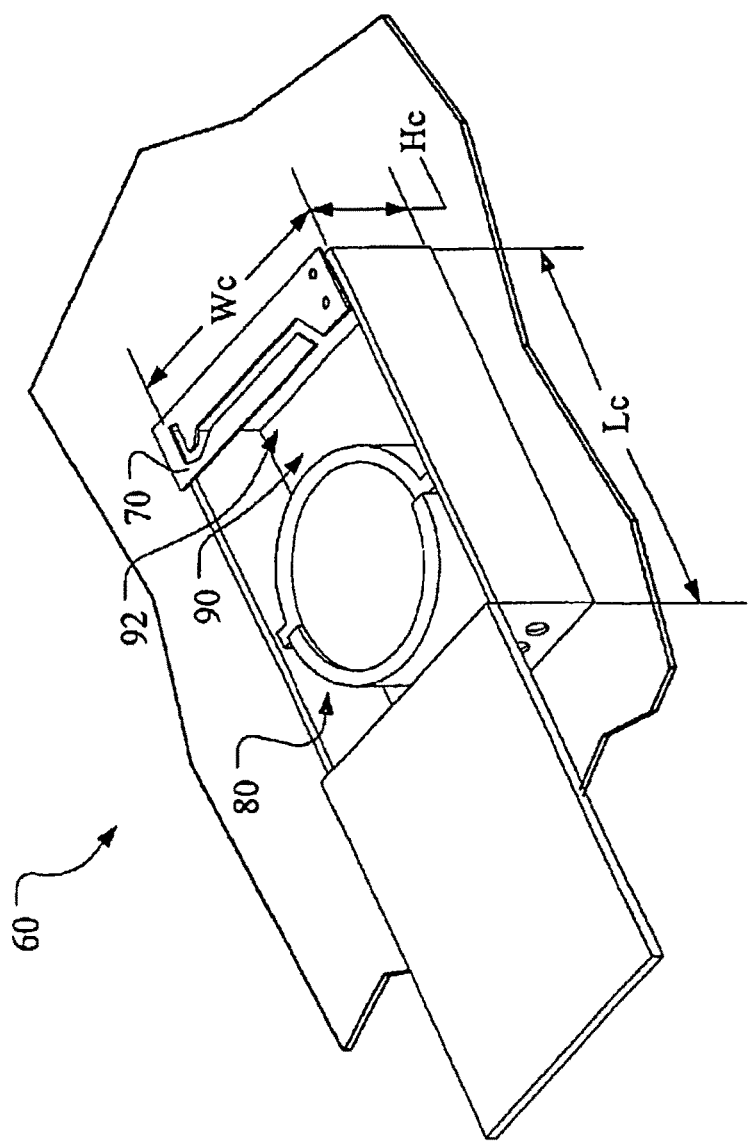
FIG. 2 shows schematically an exploded view of a prior art combined antenna and acoustic interior cavity configuration.

The following describes apparatus and methods for improved configuration of acoustic materials in combined antenna-speaker chambers in electronic devices or apparatus. In this regard reference is made to FIG. 1 which shows a schematic diagram of an exemplary electronic device or apparatus 10 which can comprise apparatus comprising acoustic material according to embodiments of the application. For example the device 10 in some embodiments can comprise a combined antenna-speaker chamber which has located within it apparatus comprising the acoustic material according to embodiments of the application.

The electronic device or apparatus 10 can, for example, be a mobile terminal or user equipment for a wireless communication system. In some other embodiments the electronic device or apparatus 10 can be an audio player (also known as MP3 players), a media player (also known as MP4 players), or an electronic book reader.

In some other embodiments the device 10 can be any suitable electronic device such as a personal data assistant (PDA), personal computer (such as a net book, tablet, or other mobile personal computer), or an electronic wallet. Although the following examples typically describe a mobile or portable apparatus within which embodiments of the application may be located or implemented, it would be appreciated that some embodiments may be implemented within fixed in position devices.

The device 10 in some embodiments comprises a display 12 mounted on the frame of the device 10 and may be suitable in some embodiments for providing the user with a user interface for displaying data. The display 12 in some embodiments can further be a touch screen display unit suitable for providing the user of the phone not only with displayed information but the ability via a touch sensitive area to relay touch based selections to the apparatus.

The device 10 furthermore in some embodiments comprises input switches or buttons such as input button 1 14, input button 2 16 and input button 3 17 suitable for providing inputs to the apparatus via a user interface other than the touch panel 12.

The electronic device or apparatus 10 furthermore in some embodiments comprises an earpiece hole 20 for enabling the output of acoustic waves generated via an acoustic or audio transducer located within the electronic device 10.

The electronic device 10 further comprises an integrated loudspeaker port 18 which is configured to provide an acoustically transparent or opaque window between the outside/external port of the apparatus and the combined antenna-speaker chamber not shown.

The integrated loudspeaker port 18 in some embodiments can be connected with the earpiece hole 20 via the combined antenna-speaker chamber where in such embodiments the transducer within the combined antenna-speaker chamber drives an acoustic wave for both earpiece and integrated loudspeaker modes.

The device in some embodiments can comprise a processor configured to control the operation of the device.

The device 10 can in some embodiments comprise an audio subsystem configured to output audio signals. The processor may in some embodiments be connected to the audio subsystem. The audio subsystem in some embodiments may be configured to output audio signals from the processor to an audio transducer located within the combined antenna-speaker chamber and associated with the earpiece hole 20 or integrated loudspeaker port 18.

The apparatus or electronic device 10 in some embodiments comprises a transceiver (TX/RX) suitable for transmitting and receiving data with further apparatus via a wireless communication protocol. Any suitable wireless communication protocol may be implemented in embodiments of the application. The processor in some embodiments is further linked to the transceiver and may control the operation of the transceiver and/or pass data to or receive data from the transceiver.

The transceiver in some embodiments enables communication with other apparatus, for example via a cellular or mobile phone gateway service such as node B or base transceiver stations (BTS) and a wireless communications network, or short range wireless communications to other devices located remotely from the apparatus.

The transceiver furthermore in some embodiments is connected to the combined antenna-speaker chamber and specifically to an antenna portion. Radio frequency signals are in these embodiments passed between the transceiver and antenna portion as the device receives or transmits data to the further apparatus.

The device 10 in some embodiments can further comprise a memory to which the processor is connected. The processor may be configured to execute various program codes. The implemented program codes may be stored for example in the memory for retrieval by the processor whenever needed. The memory in some embodiments may further provide a section for storing data received from the further device.

It is understood that the structure of the device 10 could be supplemented and varied in many ways and that the example shown in FIG. 1 represents only part of the operation of a device 10 comprising exemplary embodiments.

With respect to FIG. 3, a schematic view of the combined antenna-speaker chamber 251 implementable within a device 10 such as shown in FIG. 1 is shown in further detail. In some embodiments the combined antenna-speaker chamber is formed from the structure of the device or apparatus casing. In some other embodiments the combined antenna-speaker chamber is an assembly body suitable for locating within the structure of the device or apparatus 10. The combined antenna-speaker chamber 251 comprises in such embodiments a "speaker" 80 which can be any suitable transducer component, for example a moving coil, moving magnet, piezoelectric transducer, etc. The speaker 80 in response to signals from the audio sub-system is configured to generate acoustic waves which can exit the antenna-speaker chamber 251 via the integrated loudspeaker port 18 or earpiece hole 20.

Furthermore the combined antenna-speaker chamber 251 further comprises at least one antenna component 70 which in FIG. 3 two are shown on the lower surface of the combined antenna-speaker chamber 251. As described above the antenna component 70 in some embodiments is connected to a transceiver for radio frequency (RF) communication.

The combined antenna-speaker chamber 251 further comprises an acoustically absorbent layer 201 which in FIG. 3 is shown between the upper and lower surfaces of the combined antenna-speaker chamber 251. The acoustic apparatus or absorbent layer 201 comprises a non-conductive support 202 on which or within which patches of conductive activated carbon 203 are found. In some embodiments the non-conductive support is a non-conductive substrate. In some other embodiments the non-conductive support is a material which is configured to at least be non-conductive in areas between the patches of conductive carbon 203. As shown in FIG. 3 four patches are displayed.

The non-conductive support 202 can in some embodiments be made from woven or mesh type structures of any suitable plastic material. In some other embodiments the non-conductive support 202 can be manufactured from any material which has suitable characteristics of being non-conductive and that lets sound pass through so that acoustical functionality is not hampered. For example some suitable examples can be felt and paper. In some embodiments the non-conductive support 202 can be manufactured from any material which conductive or semi-conductive but can be rendered non-conductive and lets sound pass in the areas between the activated carbon patches by any suitable processing mechanism.

In some embodiments the non-conductive support 202 is a rigid material fixed in the combined antenna-speaker chamber 251, for example by supports offsetting the rigid material between the surfaces of the chamber. In some embodiments the non-conductive support 202 is fixed in position by adhesive. In some embodiments the non-conductive support 202 has a suitable cut out portion so as not to interfere with any speaker housing moulding or portion within the combined antenna-speaker chamber 251.

In some embodiments the non-conductive support 202 is flexible. In some embodiments the non-conductive support 202 can be a woven material or be porous such that the substrate is configured to reduce interference with the acoustical function of the activated carbon.

Figure 7A:
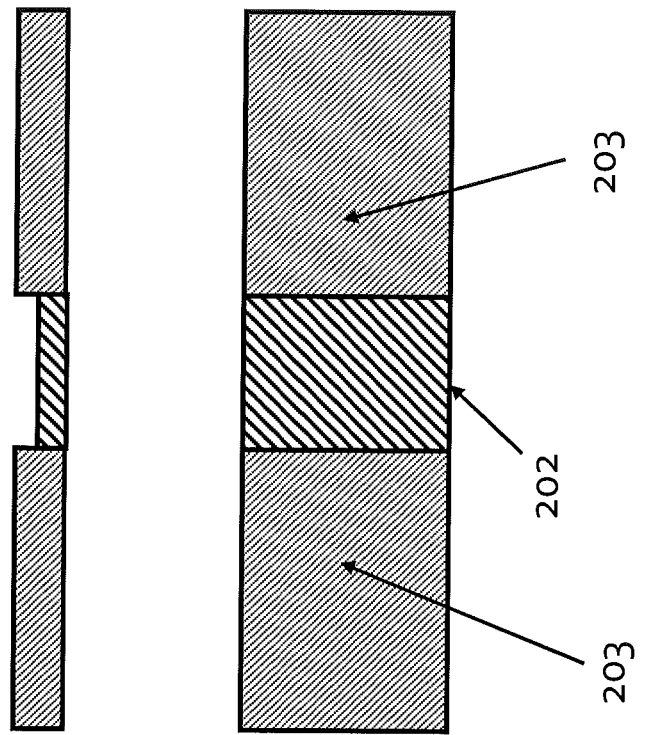

In some embodiments the activated carbon patches 203 are attached to a surface of the non-conductive substrate 202. An example of which can be seen in FIG. 7a which shows a plan and elevation view of an example configuration of the acoustically absorbent layer 201 whereby the activated carbon patches 203 are attached to the upper surface of the non-conductive support 202.

Figure 7B:
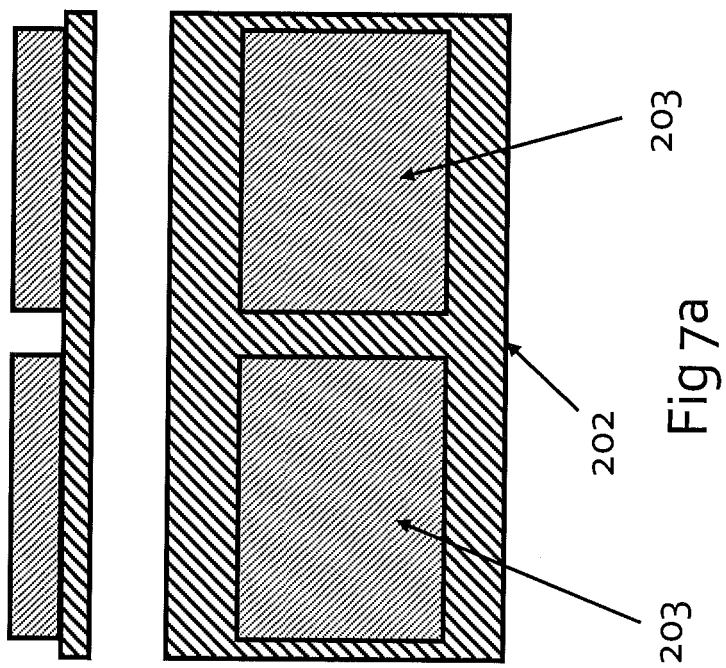

In some embodiments the non-conductive support 202 fully surrounds each of the activated carbon patches 203 such that the non-conductive support 202 connects each activated carbon patch 203 to another activated carbon patch. An example of which can be seen in FIG. 7b which shows a plan and elevation view of a further example configuration of the acoustically absorbent layer 201 whereby the activated carbon patches 203 are attached to the edges of the non-conductive support 202. In the example shown in FIG. 7b the non-conductive support 202 has a smaller thickness than the activated carbon patches 203, however it would be appreciated that in any of the embodiments the thickness of the non-conductive support 202 could in some embodiments be thicker or the same as the thickness of the activated carbon patches 203.

In some embodiments there may be more than one non-conductive support layer and layer or agglomeration of activated carbon whereby the non-conductive support layer or layers isolate the various layers of conductive activated carbon sheet patches. For example as shown in FIG. 7c the two layers 731, 733 of activated carbon sheet patches 203 are separated by an intermediate layer 735 of non-conductive support material 202.

The arrangement and shape of the patches of activated carbon 203 is shown in FIG. 7d. In some embodiments the patches 203 can be arranged in a regular pattern such as shown in FIG. 3 or in the grid arrangement 741 of FIG. 7d. In some embodiments the patches 203 can be arranged in a non-regular distribution such as the irregular arrangement 743 or regular shaped patches shown in FIG. 7d. Furthermore the patches 203 can in some embodiments be regular shapes, such as shown in FIG. 3 whereby the patches are cuboid in shape, having a vertical length shorter than the horizontal or width length. However in some embodiments the patches may themselves be non-regular in shape or non uniform and thus differ from patch to patch on the same substrate or across different substrate layers as shown for example in the irregular shape irregular arrangement 745 of FIG. 7d. In some embodiments each patch can be considered to be an acoustically adsorbing member or body. In some further embodiments each patch can comprise a plurality of connected sub-patches or sub-members of acoustically adsorbing material.

In some embodiments the activated carbon patches 203 have a physical size which is less than the electrical wavelength λ of the radio frequency signals which to be transmitted and/or received by the antenna components 70. In some embodiments the physical size is small compared to the electrical wave-length λ. For example in some embodiments the activated carbon patches 203 or any suitable acoustically adsorbing members have at least one dimension which is less than an associated radio frequency wavelength. In some embodiments the dimension which is less than the associated radio frequency wavelength can be an order of magnitude smaller than the associated radio frequency wavelength or less than 15-20% the associated radio frequency wavelength. It would be understood that the at least one dimension which is less than the associated radio frequency wavelength in some embodiments is the dimension which is physically arranged so to be configured to form a radio-frequency window for the antenna.

In such embodiments the electrical potential difference caused by the radio frequency field within each patch is small. The electrical potential difference reduces any net current flow within each patch and thus reduces greatly the electrical losses caused by the conductive activated carbon patches 203. However in such embodiments the acoustical functionality is not hampered by a division of the material into patches since for these materials the dominant acoustical mechanism is surface adsorption and since the division actually eases the flow of air towards the edges of the carbon patches 203 the acoustical efficiency of the material can actually be marginally improved over a continuous sheet configuration. Similarly the implementation in some embodiments of non-uniform or 'rough' patches, in other words irregular bodies or members can have similar advantages in producing more surface area for surface adsorption.

Furthermore the distance between the activated carbon patches 203 is configured in some embodiments to be significantly large to prevent radiative coupling between patches.

Figure 4A:
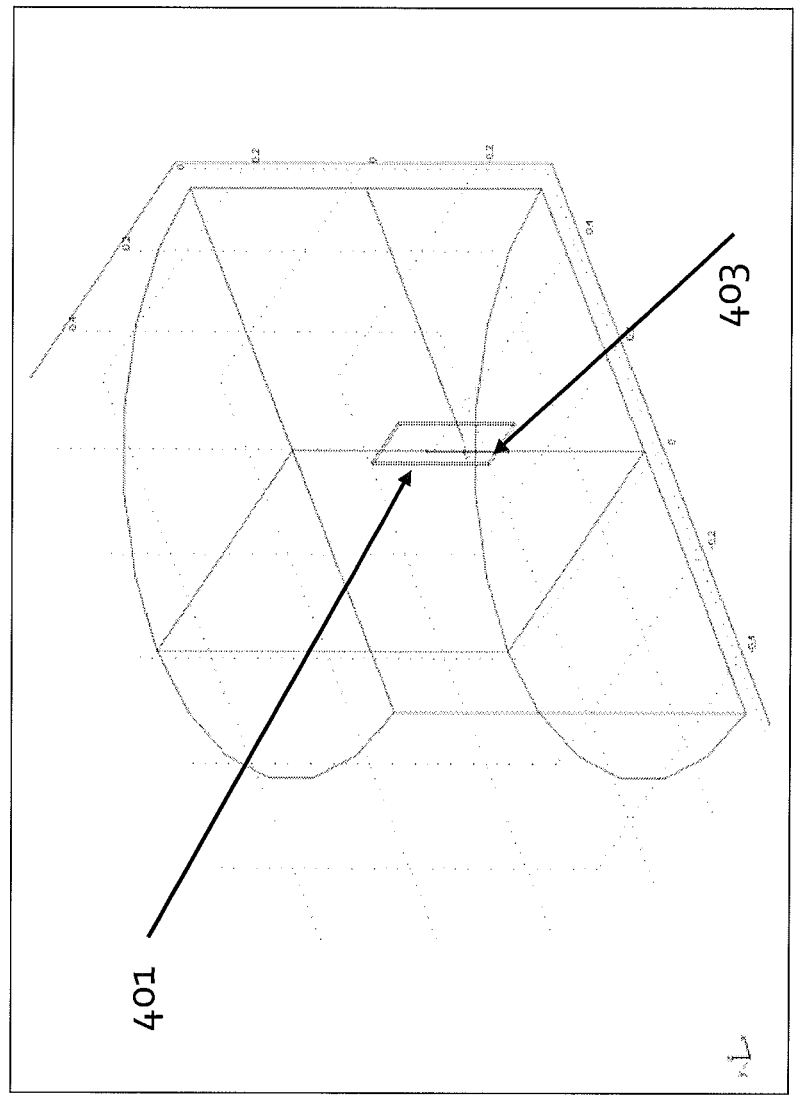

To show the advantages of the present embodiments of the present invention the inventors have carried out a series of simulations using computational models. In these simulations computations were carried out using a 0.47λ inductively driven dipole antenna as a radio frequency source located near to a solid activated carbon homogeneous sheet. For example FIG. 4a shows the 0.47λ inductively driven dipole antenna RF source 403 homogeneous carbon sheet. In the simulated examples the activated carbon was approximated by a conventional isotropic carbon with a specific conductivity of $6.1 \times 10^4$ S/m.

With respect to FIG. 4b the results of the simulation are shown whereby the dipole antenna RF source 403 and the homogeneous carbon sheet produces a electromagnetic field pattern whereby a shadow region 405 is located behind the carbon sheet where the carbon sheet absorbs the radio frequency energy and dissipates the energy in internal current.

Figure 5A:
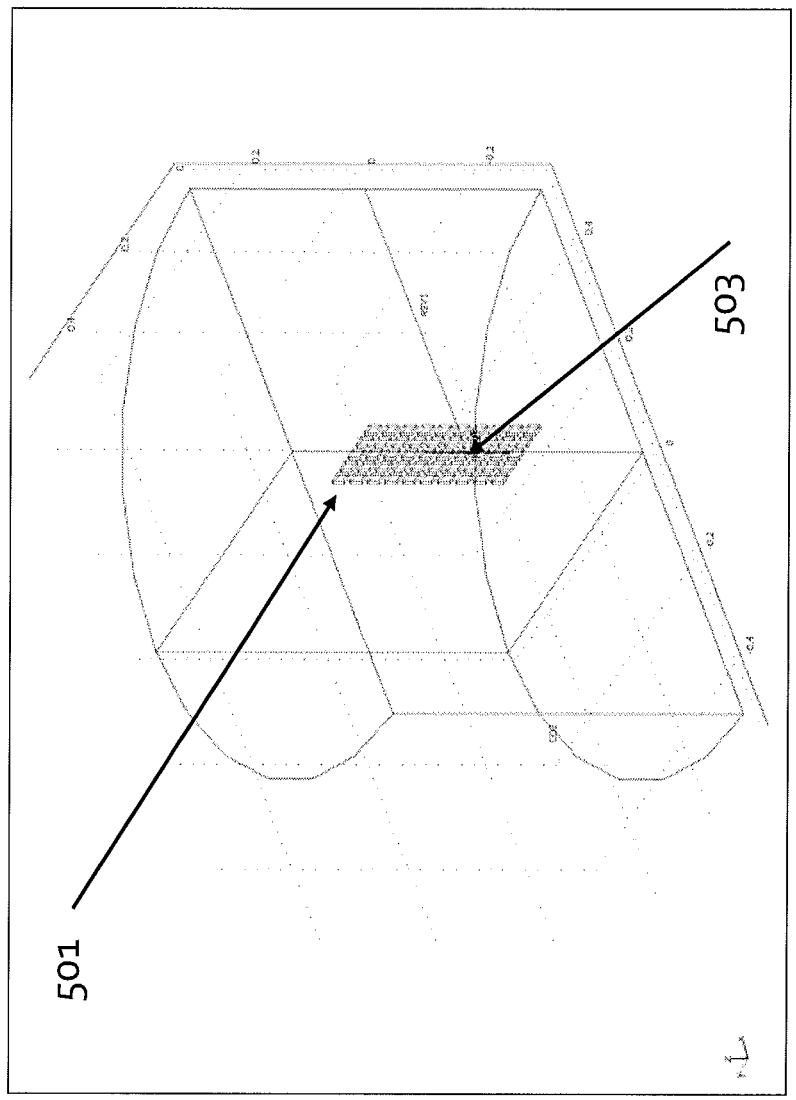
FIGS. 5a and 5b show schematically a segmented sheet model and E-field simulation.
Figure 5B:
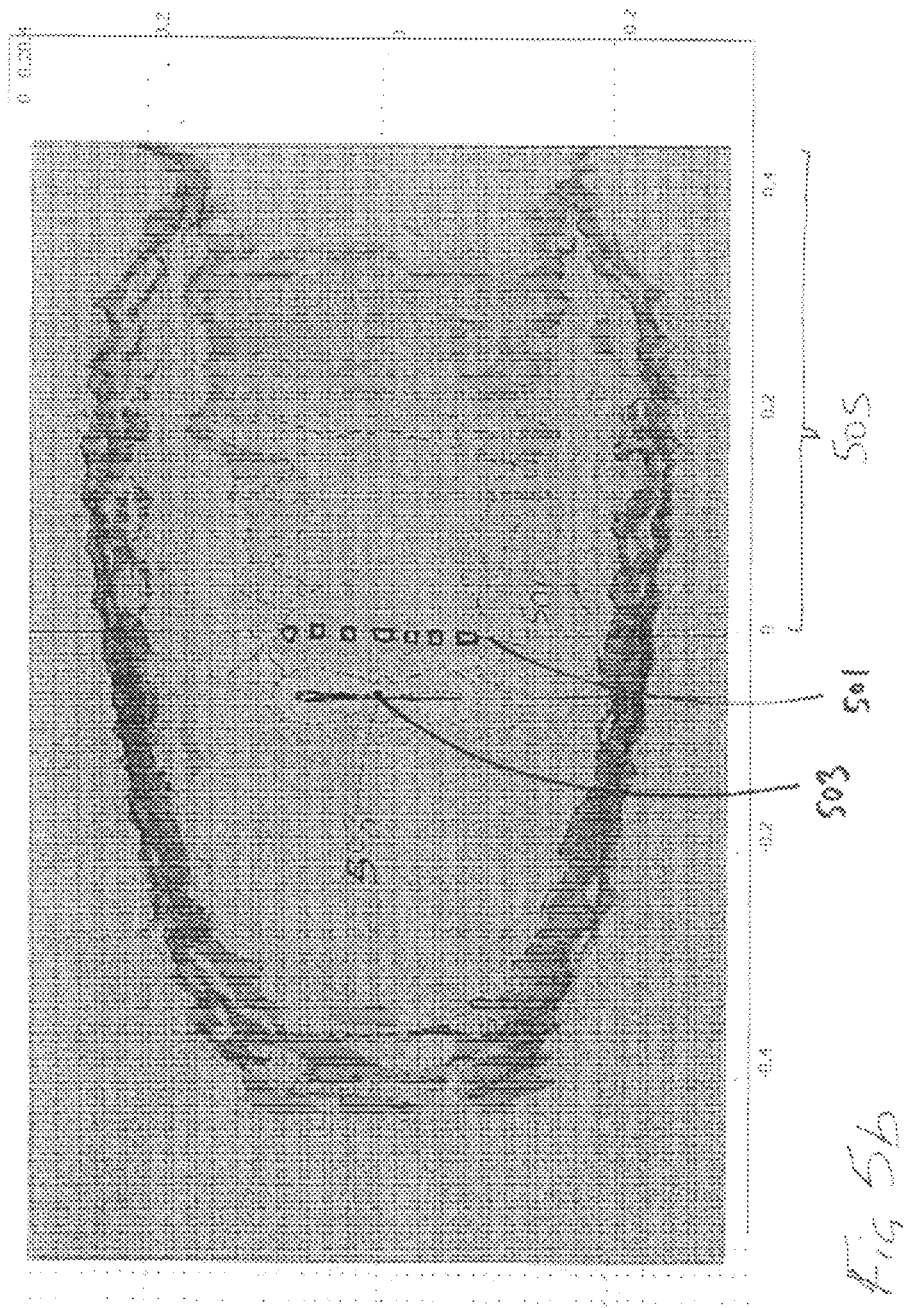

With respect to FIG. 5a the segmented carbon sheet in other words an arrangement of carbon patches with the same overall dimension as the homogeneous carbon sheet is shown displaced at a similar distance from a dipole 503. The segmented carbon sheet 501 and the dipole 503 are also shown in the graph FIG. 5b which shows the E-field strength against distance from the antenna whereby the shadow effect caused by the segmented carbon sheet is significantly reduced to the point that the simulation result produces a similar radial E-field strength to the free air radial distribution (In other words the E-field distribution to the left of the dipole is similar to the E-field distribution to the right of the dipole).

Figure 6:
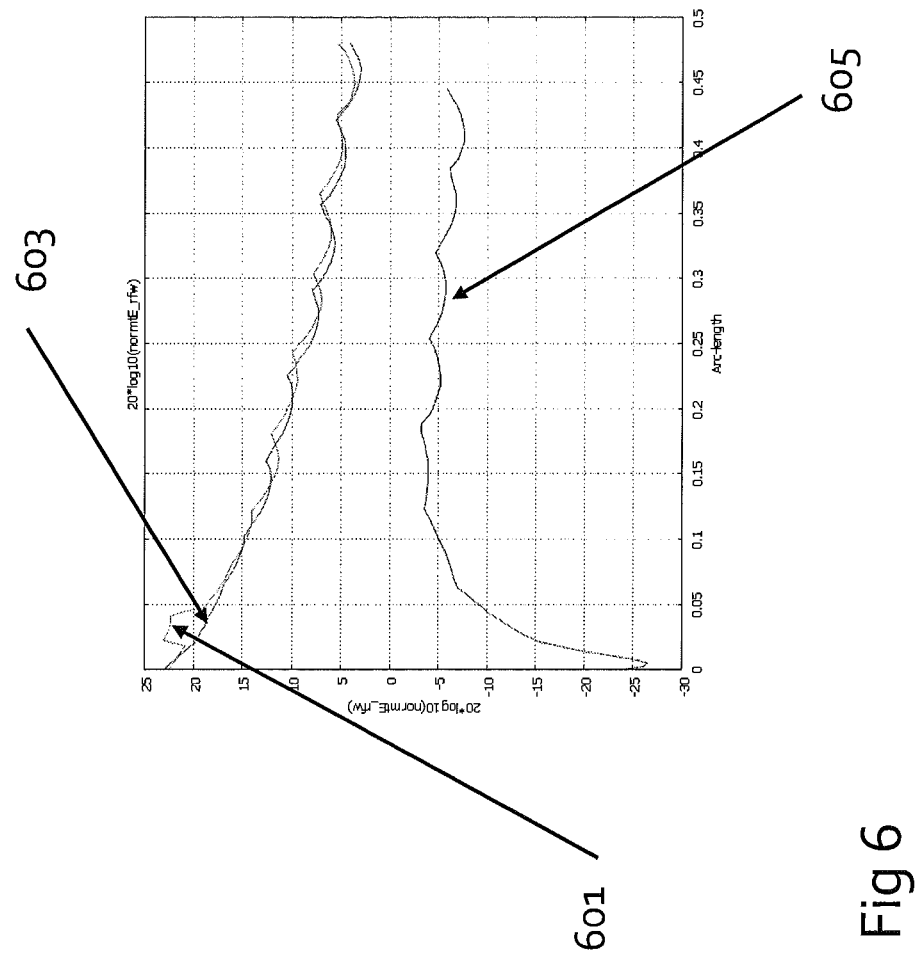
FIG. 6 shows schematically a graph showing the radial E-field distribution for homogeneous sheet, segmented sheet and free space reference models.

Similarly FIG. 6 supports these results by showing the electronic field (E-field) strength for the radial (R) length from the dipole for free space, segmented and homogeneous carbon sheet materials. In FIG. 6 the homogenous sheet plot 605 shows a significant shadowing effect whereas the segmented sheet plot, in other words the patches of carbon material plot, is shown in plot 601 where a discontinuity is shown in the segmented sheet proximity but in the far field, in other words away from the segmented sheet the electronic field strength is close to the free space reference shown by plot 603.

Thus it can be shown that the effect of activated carbon conductive material for the can significantly reduce the RF absorption by the acoustic material by minimising the material to be small patches. Similarly the material patches or segments in such embodiments are significantly smaller than the radiated wavelength to reduce the efficiency in absorption and radiation of the radio frequency signal and especially to prevent resonant scattering. Furthermore as indicated above the spacing between the segments have to be non-vanishing (in other words wide enough) to prevent radiated coupling between the segments.

In some embodiments the carbon patches can be created on the non conductive support by initially fixing to the non-conductive support a single continuous layer of activated carbon which is then machined or processed to produce the patches. In some embodiments this may be carried out using chemical etching, mechanical processing, or any suitable process to remove the carbon sheet material to form patches smaller than the wavelength of the radio frequency signal. In some other embodiments the carbon patches are preformed and located within or on a non-conductive support material. For example the carbon patches may be pressed into a non-conductive support which is at a mouldable phase, for example under heat. In some embodiments the carbon patches could be cut from a sheet of material using a laser. In such embodiments the patches can in some embodiments be formed by cutting a sheet into patches and then attaching the patches to the support or by using a cutting laser which is selectively able to remove carbon from the substrate once the carbon sheet or layer is deployed on the support.

In some further embodiments the structure can be manufactured by depositing a carbon layer on a flexible support. The support layer is in such embodiments stretched in order to fit into the combined antenna-speaker chamber 251. The action of stretching on the flexible support layer can then cause the carbon sheet to break into patches. In some embodiments the carbon sheet can be weakened or scored to assist in the breaking of the carbon sheet into patches smaller than the wavelength expected to be used.

Although the above has discussed the use of carbon patches and sheets of carbon to be used as an acoustically adsorbing body or agglomeration of acoustic adsorbing members it would be understood that any suitable adsorbent material could be used in any suitable agglomeration or agglomerations of absorbing members or bodies. For example carbon nanotubes could be used singularly or in groups connected together to form acoustically adsorbing members.

Hence in at least one embodiment there may be a method of using an agglomeration of acoustically adsorbing members suitably located substantially on or in a non-conductive substrate, wherein each acoustically adsorbing member is separated from neighbouring members. In at least one of these embodiments each acoustically adsorbing member has dimensions less than an associated radio frequency wavelength in an acoustic transducer system.

It shall be appreciated that the term electronic device and user equipment is intended to cover any suitable type of wireless user equipment, such as mobile telephones, portable data processing devices or portable web browsers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus in at least one of the embodiments there is an apparatus comprising an agglomeration of acoustically adsorbing members suitably located substantially on or in a non-conductive support, wherein each acoustically adsorbing member is separated from neighbouring members. Furthermore each acoustically adsorbing member may have at least one dimension less than an associated radio frequency wavelength. Also in at least one embodiment each acoustically adsorbing member has at least one dimension less than 20% of the associated radio frequency wavelength.

The embodiments of this invention may be designed by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

Hence in at least one embodiment there is provided a computer-readable medium encoded with instructions that, when executed by a computer perform: designing an apparatus comprising an agglomeration of acoustically adsorbing members suitably located substantially on or in a non-conductive support, wherein each acoustically adsorbing member is separated from neighbouring members.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits (such as field programmable gate array—FPGA circuits) and processors based on multi-core processor architecture, as non-limiting examples.

Embodiments of the inventions may be practiced in various components such as integrated circuit modules. The design of PWB and RF designs are by and large a highly automated process. Complex and powerful software tools are available for converting a design into a Printed Wired Board design ready to be etched and formed on a substrate.

Programs automatically route conductors and locate components on a substrate using well established rules of design as well as libraries of pre-stored design modules. Once the design for a substrate or circuit has been completed, the resultant design, in a standardized electronic format may be transmitted to a fabrication facility or for fabrication.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
an acoustic chamber configured to be shared by at least an antenna portion and an audio transducer in an attempt to meet both acoustic requirements and radio frequency requirements;
an agglomeration of acoustically adsorbing members in the acoustic chamber arranged to enable an antenna functionality by the antenna portion, the audio transducer being operably connected to the acoustic chamber, the agglomeration of acoustically adsorbing members being suitably located substantially on or in a substrate such that at least one acoustically adsorbing member is affixed at least to one surface of the substrate, wherein each acoustically adsorbing member is separated from neighbouring acoustically adsorbing members by an air gap or a non-conductive support material; and
wherein the audio transducer is acoustically connected to the acoustic chamber and configured to generate acoustic waves which enter the acoustic chamber upon driving the audio transducer;
wherein each acoustically adsorbing member has at least one dimension less than associated radio frequency wavelength of a radio frequency signal to be transmitted and/or received by the antenna portion.

2. The apparatus as claimed in claim 1, wherein the acoustically adsorbing members comprise at least one of:
activated carbon bodies;
carbon nanotubes; and
a plurality of connecting sub-member bodies.

3. The apparatus as claimed in claim 1, wherein the acoustically adsorbing members are substantially regular in shape.

4. The apparatus as claimed in claim 1, wherein the acoustically adsorbing members are substantially identical.

5. The apparatus as claimed in claim 1, wherein the acoustically adsorbing members are non-regular in shape and/or non-uniform.

6. The apparatus as claimed in claim 1, wherein the acoustically adsorbing members comprise separated parts of a single acoustically adsorbing material piece.

7. The apparatus as claimed in claim 1, wherein the substrate comprises a substantially acoustically transparent material upon which the agglomeration of acoustically adsorbing members are located such that each acoustically adsorbing member is separated from neighbouring acoustically adsorbing members by the air gap.

8. The apparatus as claimed in claim 1, wherein the substrate comprises a substantially acoustically transparent material within which the agglomeration of acoustically adsorbing members are deposited such that each acoustically adsorbing member is substantially separated from neighbouring acoustically adsorbing members by the substrate.

9. The apparatus as claimed in claim 1, wherein the substrate comprises a grid or mesh structure.

10. The apparatus as claimed in claim 1, wherein the substrate is a flexible material.

11. The apparatus as claimed in claim 1, further comprising at least one further agglomeration of acoustically adsorbing members affixed substantially on or in a further substrate, wherein each agglomeration is separated by at least one of the substrate or further substrate.

12. The apparatus as claimed in claim 1, further comprising at least one further agglomeration of acoustically adsorbing members,
wherein when the agglomeration of acoustically adsorbing members is on the one surface of the substrate, the further agglomeration of acoustically adsorbing members is affixed to a further side of the substrate.

13. The apparatus as claimed in claim 1, wherein each acoustically adsorbing member has at least one dimension less than 20% of the associated radio frequency wavelength.

14. The apparatus as claimed in claim 1, wherein the acoustic chamber further comprises an antenna element configured to operate at the associated radio frequency wavelength.

15. The apparatus as claimed in claim 1, wherein the acoustically adsorbing members are located within the acoustic chamber wherein the acoustic chamber is a combined antenna-speaker chamber and is at least one of:
formed from a structure of the apparatus or a cover of the apparatus, and
an assembly body suitable for locating within a structure of the apparatus.

16. A method comprising:
outputting an audio signal from a processor to which a memory is connected; and
receiving the audio signal in an audio transducer acoustically connected to an acoustic chamber and configured to generate acoustic waves which enter the acoustic chamber upon driving the audio transducer, the acoustic chamber being configured to be shared by at least an antenna portion and the audio transducer in an attempt to meet both acoustic requirements and radio frequency requirements and having an agglomeration of acoustically adsorbing members arranged to enable an antenna functionality by the antenna portion, the audio transducer being operably connected to the acoustic chamber, the agglomeration of acoustically adsorbing members being suitably located substantially on or in a substrate such that at least one acoustically adsorbing member is affixed to one surface of the substrate, wherein each acoustically adsorbing member is separated from neighbouring acoustically adsorbing members by an air gap or a non-conductive support material;
wherein each acoustically adsorbing member in an acoustic transducer system has dimensions less than an associated radio frequency wavelength of a radio frequency signal to be transmitted and/or received by the antenna portion.

17. The method as claimed in claim 16, wherein each acoustically adsorbing member has dimensions less than 20% of the associated radio frequency wavelength.

* * * * *